(12) United States Patent
Gershinsky et al.

(10) Patent No.: US 8,781,768 B2
(45) Date of Patent: Jul. 15, 2014

(54) DATA REDUCTION IN A MULTI-NODE SYSTEM

(75) Inventors: Gidon Gershinsky, Haifa (IL); Liane Lewin-Eytan, Binyamina (IL); Yossi Richter, Kfar Saba (IL); Konstantin Shagin, Haifa (IL); Elad Yom-Tov, Mizpe Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 12/836,605

(22) Filed: Jul. 15, 2010

(65) Prior Publication Data

US 2011/0184676 A1 Jul. 28, 2011

Related U.S. Application Data

(60) Provisional application No. 61/297,833, filed on Jan. 25, 2010.

(51) Int. Cl.
*G01R 21/00* (2006.01)

(52) U.S. Cl.
USPC .......................................................... 702/62

(58) Field of Classification Search
USPC .................... 702/62, 104, 182, 183, 185, 188; 340/870.02, 870.16, 870.05, 870.1
See application file for complete search history.

(56) References Cited

U.S. PATENT DOCUMENTS

| | | | |
|---|---|---|---|
| 6,553,353 B1 | 4/2003 | Littlejohn | |
| 7,053,790 B2 | 5/2006 | Jang et al. | |
| 7,379,981 B2 | 5/2008 | Elliott et al. | |
| 7,620,608 B2 | 11/2009 | Jaros et al. | |
| 7,953,577 B2* | 5/2011 | Yuan et al. | 702/185 |
| 8,140,658 B1* | 3/2012 | Gelvin et al. | 709/224 |
| 2006/0220903 A1 | 10/2006 | Zigdon et al. | |
| 2009/0248712 A1 | 10/2009 | Yuan | |
| 2012/0109872 A1* | 5/2012 | Havinga et al. | 706/52 |

OTHER PUBLICATIONS

G. S. Tomar, et al., "Dynamic Multi-level Hierarchal Clustering Approach for Wireless Sensor Networks", Proceedings of the UKSim 2009: 11th International Conference on Computer Modeling and Simulation; pp. 563-567. Publisher: IEEE Computer Society.
Chaurasiya V.K, et al., "Traffic Based Clustering in Wireless Sensor Network", Wireless Communication and Sensor Networks, 2008, pp. 83-88. Publisher: IEEE.

* cited by examiner

*Primary Examiner* — Sujoy Kundu
*Assistant Examiner* — Ricky Ngon
(74) *Attorney, Agent, or Firm* — Ziv Glazberg (57) ABSTRACT

An advanced metering infrastructure comprises intermediate nodes. The intermediate nodes receive data from child nodes and aggregate the data according to groups of child nodes. The aggregation provides for a reduced version of the data. The reduction is performed based on groups determined by clustering. The reduced version of the data comprises data describing a group of measurements over time, such as a centroid in an n-dimension space, number of customers in the group, radius of the group and the like. The centroid may shift over time based on a consumption profile, such as low consumption at noon, and high consumption at evening. The consumption profiles may be determined in a learning phase, as well as shifting of centroids of each group over time.

19 Claims, 4 Drawing Sheets

DATA REDUCTION IN A MULTI-NODE SYSTEM

CROSS REFERENCE TO RELATED APPLICATIONS

The present application claims the benefit of U.S. Provisional Application No. 61/297833 filed Jan. 25, 2010, which is hereby incorporated by reference.

BACKGROUND

The present disclosure relates to monitoring system, such as Advanced Metering Infrastructure (AMI), in general, and to compacting data transmitted from sensors of the monitoring system prior, in particular.

An advanced metering infrastructure (AMI) is a system that monitors usage of a resource, such as electricity, gas, water, traffic infrastructure and the like. The AMI may measure, collect and analyze data originated from metering devices, also referred to as sensors. Sensors transmit measurements towards an operator node, which may utilize the data in monitoring activities and may initiate actions in response to the monitored data. As opposed to traditional systems, AMI systems are able to monitor usage frequently, such as each minute, hour or the like. The AMI may have the ability to identify consumption in more detail than conventional metering systems, and to communicate that information via an underlying network. The sensors may be massively deployed so as to cover geographical regions of interest, and may be configured to transmit their monitored measurements both upon request and on a regular schedule.

Examples of AMIs are systems measuring natural gas or water consumption, providing information on when, where and how much of the respective resources are being used. For example, a system measuring water consumption may use wireless vibration sensors attached to pipes to estimate the water flow on each outlet. Another example is a smart grid, which is an electricity network that provides an improvement in comparison to traditional electricity networks in operations, maintenance, planning and the like by connecting all components of the electricity grid, allowing a two-way communication between consumers and provider, and the like. Aside from devices measuring public utilities services, such as water, gas and electricity, an AMI could also be used for other kind of purposes such as monitoring road and traffic conditions in a city. Such systems require the deployment of dedicated sensors on vehicles or on the roadside, allowing monitoring complex traffic flows as well as varied road conditions.

BRIEF SUMMARY

One exemplary embodiment of the disclosed subject matter is a computerized system comprising: at least one intermediate node; wherein the at least one intermediate node is connected to a plurality of sensors operable to monitor usage of a resource; wherein the at least one intermediate node is connected to an operator node; wherein the at least one intermediate node comprises: a receiver configured to receive data from the plurality of sensors; wherein the data is indicative of usage of the resource during a timeframe; a clustering module configured to determine a set of clusters based upon the data; wherein each cluster of the set of clusters groups one or more sensors of the plurality of sensors; a data reduction module configured to determine a reduced data associated with a cluster of the set of clusters; the reduced data comprises: a consumption profile indicative of usage of the resource during the timeframe; identifications of sensors grouped by the cluster; and a transmitter configured to send the reduced data.

Another exemplary embodiment of the disclosed subject matter is a computerized method for transmitting data from a plurality of sensors to an operator node through at least one intermediate node, wherein the plurality of sensor are operable to monitor usage of a resource; the method comprises at the at least one intermediate node: receiving data from the plurality of sensors; wherein the data is indicative of usage of the resource during a timeframe; determining a set of clusters based upon the data; wherein each cluster of the set of clusters groups one or more sensors of the plurality of sensors; determining a reduced data associated with a cluster of the set of clusters; the reduced data comprises: a consumption profile indicative of usage of the resource during the timeframe; identifications of sensors grouped by the cluster; and transmitting the reduced data towards the operator node.

Yet another exemplary embodiment of the disclosed subject matter is a computer program product for an intermediate node transmitting data received from a plurality of sensors towards an operator node, the computer program product comprising: a non-transitory computer readable media; a first program instruction for receiving data from the plurality of sensors; wherein the data is indicative of usage of a resource during a timeframe; a second program instruction for determining a set of clusters based upon the data; wherein each cluster of the set of clusters groups one or more sensors of the plurality of sensors; a third program instruction for determining a reduced data associated with a cluster of the set of clusters; the reduced data comprises: a consumption profile indicative of usage of the resource during the timeframe; and identifications of sensors grouped by the cluster; and a fourth program instruction for transmitting the reduced data towards the operator node; and wherein the first, second, third and fourth program instructions are stored in the non-transitory computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to reduce an amount of data transmitted in a system. Another technical problem is to provide an operator node of the system information useful for monitoring measured levels of consumption. Yet another technical problem is to identify problematic sensors or monitored activities.

One technical solution is to determine clustering of sensors based on their monitored data. A cluster may group sensors that monitored similar activities. A representative data set, also referred to as a reduced data, may be used to represent all the monitored data associated with the clusters in a reduced manner. Another technical solution is to represent a data of a sensor over a timeframe using an n-dimensional point, wherein a value in each dimension is associated with a monitored consumption value at during a time (or time slot) in the timeframe. Using conventional methods, clustering of nearby points may be performed to determine the clusters. A sphere-like spatial shape may be defined for a cluster using a centroid of the shape and a radius. The shape may determined to comprise all the points associated with the cluster. The reduced data may therefore include the centroid, identifications of sensors within the cluster and the radius. Yet another technical solution is to perform clustering and data reducing activities in respect to each level of a hierarchical system, thus in each level the amount of data originating from a lower level is reduced. Yet another technical solution is to determine expected data of a cluster, based on past data. Expected data may be used to avoid transmitting data that is determined to be as expected. Expected data may further be utilized to detect an error associated with the system, such as a sensor malfunctioning, electrical power interruption or the like, and unexpected behavior such as high volume consumption so as to prepare accordingly.

One technical effect of utilizing the disclosed subject matter is to reduce amount of transmitted data. Several technical effects of such reduction may be: utilization of a smaller bandwidth; reduction in power consumption of transmitting components, such as wireless transmitters (e.g., WiFi modems, cellular modems, RF transmitters and the like). As some components of the systems may not be connected to an electric grid and use batteries instead, reduction in power consumption may prolong the time in which the components work without performing maintenance activity. Additionally, the amount of data to be processed by the operator node may be reduced and may be more easily handled and presented to a user. Another technical effect of utilizing the disclosed subject matter is to provide for a distributed processing of the data provided by the sensors. Intermediate nodes of the system may perform some processing activity to reduce the amount of data and therefore reduce processing time of the operator node (as would be the case in a centralized system). Yet another technical effect is to enable substantially "real-time" operation of the system. In case the operator node is provided with high volume of data, processing the data in real-time may not be possible. Sending reduced data provides for a reduction in data volume to be received and processed by the operator node and therefore may be processed in (substantially) real-time. It will be noted that in AMIs, data transmission may be performed in high frequencies, such as every minute, and therefore without compression of the data, the operator node may be overloaded. The disclosed subject matter may provide for a reduced data that provides a summarized view of the data.

Figure 1:
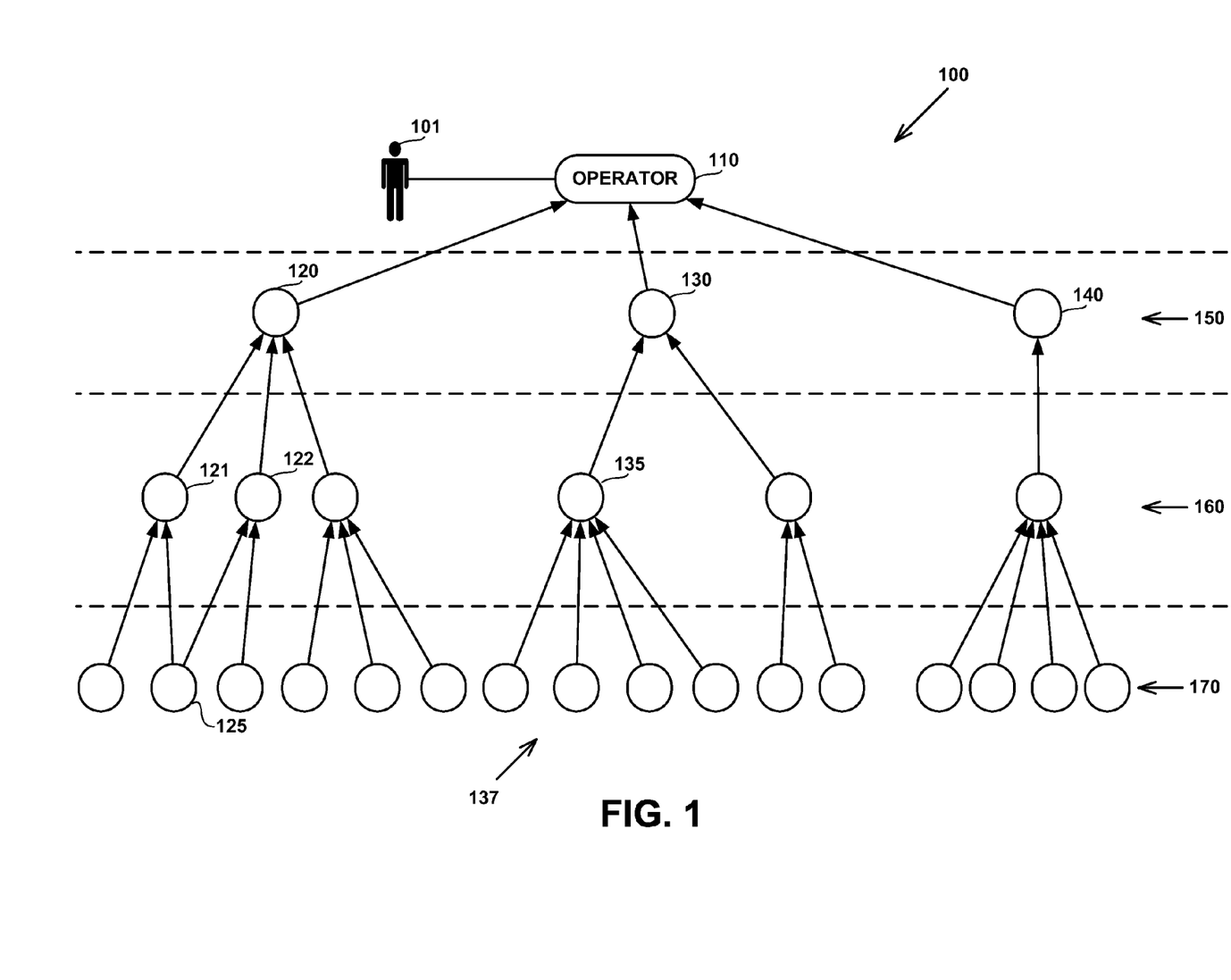
FIG. 1 shows an exemplary system in which the disclosed subject matter is used, in accordance with some exemplary embodiments of the disclosed subject matter.

Referring now to FIG. 1 showing an exemplary system in which the disclosed subject matter is used, in accordance with some exemplary embodiments of the disclosed subject matter. A system 100 may comprise an operator node 110, a plurality of intermediate nodes, such as 120, 130, 140, and plurality of sensors, represented by leafs in the system 100. The system 100 comprises a multiple level hierarchy. A first level 170 comprises sensors, a second level 160 comprises intermediate nodes, such as 121, a third level 150 comprises intermediate nodes such as 120, and an operator node 110. In some exemplary embodiments, there may be one or more hierarchy levels of intermediate nodes such as levels 150 and 160. Node 135 is connected to a plurality of sensors 137.

Each intermediate node of the system 100 may be connected to a different number of nodes. For example, node 140 is connected to one intermediate node, whereas node 120 is connected to three intermediate nodes. In some exemplary embodiments, each intermediate node may be connected to dozens, hundreds of sensors or the like.

In some exemplary embodiments, an intermediate node may be connected to sensors that are located near-by, such as for example within a geographical region; associated with each other, such as for example owned by a same entity; or the like.

Generally, nodes of the system 100 transmit data originating from the sensors in level 170 towards the operator 110. A direction of an edge of the system 100 represents a direction of transmission between the nodes. For example, node 122 is able to send data to node 120. In some exemplary embodiments, a bi-directional transmission is available, though not shown. Some nodes, such as sensor 125, may be connected to two or more nodes of a higher level, such as nodes 121 and 122 and therefore provide duplicative sent. The duplicative data may be useful for persistency of the system 100, such as for example to avoid loss of data due to unreliable transmissions. Node 120, operator 110 or the other node may be configured to identify duplicative data and dispose of the duplication. In some exemplary embodiments, each node of the system 100 has a unique identifier that may be used to identify duplicative data.

A child node of a parent node is a node that is configured to send data to the parent node. For example, sensor 125 is a child node of node 122. As another example, intermediate node 122 is a child node of node 120. An intermediate node is a node of the system 100 which is not a sensor nor the operator node 110. Each node may have a different number of child nodes. In some exemplary embodiments, a node may have some child nodes that are intermediate nodes and some child nodes that are sensors.

A user 101 may utilize the operator node 110 to monitor usage of monitored resource, as detected by the sensors. The user 101 may utilize a Man-Machine-Interface such as a terminal. The user 101 may view a summary of the monitored data, In some exemplary embodiments, the system 100 may be characterized with a massive number of measurements being transmitted from sensors of the system 100 towards the operator 110 in a timeframe. The system 100 may provide the user 101 with a reduced view and aggregated presentation of the transmitted data. In some exemplary embodiments, the timeframe may be a predetermined time interval. In some exemplary embodiments, the timeframe may be determined not based on a time interval. For example, based on an input from the user 101, after a threshold consumption identified by one or more sensors or the like.

Each intermediate node of the system 100 may be equipped with a processor, such a CPU, a Integrated Circuit (IC), or other processing component, that is configured to perform some processing in accordance with the disclosed subject matter. For example, a node may be configured to receive data from child nodes, to process the data to determine a reduced data and to transmit the reduced data. In some exemplary embodiments, a sensor may comprise a processor as well.

The disclosed subject matter provides for reduction of monitored data provided by sensors over one or more levels of the system 100. In some exemplary embodiments, for each level, a clustering may be performed based on values originating from a lower level. Similar data are grouped together in a cluster and an aggregated view of the similar data is transmitted to a higher level of the system 100. Aggregated view of data may be further aggregated in the higher level. The operator node 110 of the system 100 may be provided with aggregated view of the measurements values of all sensors of the system 100 that corresponds to a list of different consumption patterns.

In some exemplary embodiments, the sensors of the system 100 may be associated with consumers of the resource. For example, a sensor may be associated with a household, a firm, a factory or any customer of a company providing the resource and the like.

Figure 2:
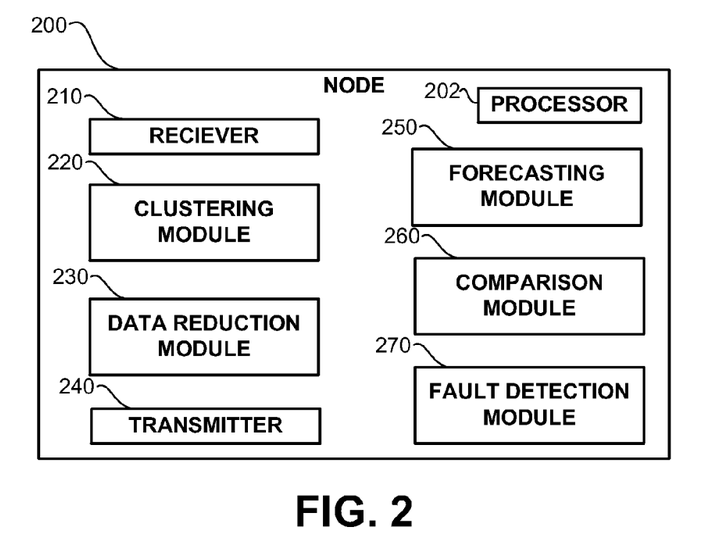
FIG. 2 shows a block diagram of a node in an exemplary system, in accordance with some exemplary embodiments of the disclosed subject matter.

Referring now to FIG. 2 showing a block diagram of a node in an exemplary system, in accordance with some exemplary embodiments of the disclosed subject matter. A node 200, such as node 130 of FIG. 1, may be configured to receive data from child nodes and to transmit a reduced data to a parent node (e.g., intermediate node or the operator node 110).

In some exemplary embodiments, the node 200 comprises a processor 202 configured to perform processing required by the node 200 or any if its subcomponents.

In some exemplary embodiments, a receiver 210 is configured to receive data from one or more child nodes of the node 200. The receiver 210 may be a modem, a transceiver, an antenna or the like. In some exemplary embodiments, the receiver 210 may be a wireless receiver, such as a WiFi modem, a cellular modem or the like. In some exemplary embodiments, the receiver 210 may be a wired receiver.

In some exemplary embodiments, the data being received by the receiver 210 is a measurement of consumption of a resource in a specific date. The receiver 210 may determine, based on the received data and prior data, an n-dimensional array of values associated with the consumption of a resource during a timeframe. Each value in a cell of the array corresponds to a measured consumption of a resource in a time slot within the timeframe. For example, a 96 dimensional array may be used to represent the consumption over 24 hours in time slots of 15 minutes (24*4=96). For each quarter of an hour one measured value may be used. In some exemplary embodiments, each quarter of an hour is represented by a mean, median or the like of measured values during the quarter of an hour. In some exemplary embodiments, a measured value measured during the time interval may be selected arbitrarily, such as for example based on the time of measurement (e.g., at the beginning, end or middle of the time interval), randomly or the like.

In some exemplary embodiments, the receiver 210 may receive the n-dimensional array from its child node. In other exemplary embodiments, the receiver 210 may compute the array based on previously received data that may be stored in a memory (not shown).

In some exemplary embodiments, the receiver 210 may receive multiple arrays or measurements associated with a single consumer, such as for example in case that there are multiple sensors in a household measuring electricity usage of different electrical appliances. In some exemplary embodiments, a consumer associated with the measured data is identified using a unique identifier, such as an ID number, a client number or the like. The receiver 210 may be configured to receive the identifier together with the measured data.

In some exemplary embodiments, a clustering module 220 may be configured to determine a set of clusters of child nodes based upon the data received by the receiver 210 from the child nodes. The clustering module 220 may utilize a clustering algorithm such as K-means, agglomerative hierarchical clustering and the like. In some exemplary embodiments, the clustering module 220 may determine the clusters based on a distance between points in an n-dimensional space, wherein each point in the space is a representation of an n-dimensional array associated with a child node. It will be noted that though the term "distance" is used, a physical location of the child node is irrelevant for the distance in the n-dimensional space. The term "distance" is used to represent a measurement of similarity between data of different child nodes, as is exemplified by a distance in a space. However, other measurements of similarity may be used such as for example variance, standard deviation or the like.

In some exemplary embodiments, the clustering module 220 may be provided with predetermined values, such as maximal radius of a cluster, a maximal number of clusters and the like.

In some exemplary embodiments, a data reduction module 230 may be utilized to determine a reduced data for a cluster determined by the clustering module 220. The reduced data may be indicative of the data associated with child nodes of the cluster. In some exemplary embodiments, the reduced data may comprise a consumption profile associated with the child nodes, such as, for example, an average consumption profile comprising average values of consumption during the time slots of the timeframe.

The consumption profile may be indicative of usage of the resource during the timeframe as detected by the sensors associated with the cluster. The consumption profile may be for example an average value of the data associated with the child nodes. An average value may be determined based on an average value, density of data, variance in the data, and the like.

The consumption profile may be a centroid of a spatial shape in the space. In some exemplary embodiments, considering a 2-value array representative of a point in a space having 2-dimensions, a centroid may be a center of a circle that comprises all points associated with the child nodes of the cluster, also referred to as points of the cluster. In some exemplary embodiments, another spatial shape, such as a polygon, an ellipse, a sphere-like shape, or the like, may be used instead of a circle. The centroid may be determined as an average of the points, a median of the points, a point minimizing the sum of distances to the points, a point minimizing a radius of a sphere-like spatial shape that comprises the points and the like.

The reduced data may further comprise an indication of the variance of the data of the cluster. For example, consider the aforementioned circle to be of a small radius as all points are relatively close. An opposite example would include a large circle as some points are located far from the centroid. The reduced data may comprise a radius of the spatial shape (e.g., circle). In some exemplary embodiments, the radius may comprise multiple values associated with different dimensions, and each value may indicate a maximal distance between the centroid and the points of the cluster in a predetermined dimension. In some exemplary embodiments, the reduced data may include an indication, such as identifiers, of child nodes/sensors associated with the centroid (i.e, comprised by the spatial shape). The identifiers may be utilized to enable a receiving party, such as an operator node 110, to determine how many child nodes are associated with the cluster and which of the child nodes are associated with the cluster. In some exemplary embodiments, a number of child nodes may be comprised instead of the indication. In some exemplary embodiments, the identifiers are of sensors and not child nodes. Meaning, that in case of a third level intermediate node such as 130 of FIG. 1, the identifiers are associated with the sensors, such as 137 of FIG. 1, and not with other intermediate nodes such as 135 of FIG. 1.

In some exemplary embodiments, the node 200 may comprise a transmitter 240 configured to transmit or otherwise send to a parent node, be it another intermediate node similar to 200 or directly to an operator node 110, the reduced data determined by the data reduction module 230. In some exemplary embodiments, the transmitter 240 may transmit a portion of the reduced data. For example, instead of sending the n-dimensional array representing the centroid, a value of the last cell (i.e., value of centroid in respect to the last time slot) may be sent. The centroid may be recomputed by the receiving end by adding previously sent values to provide for the centroid.

In some exemplary embodiments, a forecasting module 250 may be configured to determine an expected data based on past data. Machine learning methods, such as adaptive filter, Least Mean Square method, Kalman filter, or the like may be utilized to determine the expected data. The expected data may be a centroid and a radius. In some exemplary embodiments, the expected data is a centroid of a spatial shape associated with a cluster, such that each point of a child node that was comprised by the cluster in the past (e.g., in a previous clustering determination) is expected to be within the spatial shape.

In some exemplary embodiments, a comparison module 260 may be utilized to determine whether a data received from a child node is in accordance with the excepted data of the pertinent cluster. A computation of clusters by the clustering module 220 may be avoided for the data of child nodes that is similar to the expected data. In some exemplary embodiments, the transmitter 240 may be configured to avoid sending data associated with child nodes that is similar to the expected data. Instead, a signal, such as a heartbeat, may be sent to indicate that the data is as expected. In some exemplary embodiments, the forecasting module 250 may be in the child node.

In some exemplary embodiments, the comparison module 260 may determine that a data is not according to the expected data based on a point associated with the data not being comprised by a spatial shape associated with the expected data. In some exemplary embodiments, if the distance between the point and the centroid is higher than a maximal distance from the centroid of the spatial shape, such as a radius, then the data may be said to be not in accordance with the expected data.

In some exemplary embodiments, in case a data is not in accordance to the expected data, a determination whether it is in another cluster may be performed. For example, a child node that measures electricity usage of an apartment may be initially associated with a residential usage cluster. In case the apartment is transferred to an office, the data may be different than expected residential usage, but similar to that of a commercial usage cluster.

In some exemplary embodiments, a fault detection module 270 may use the expected data to detect errors. The fault detection module 270 may indicate to a user, such as 101 of FIG. 1, that a sensor is malfunctioning, experiencing an error, losing power supply or the like. The fault detection module 270 may indicate to the user of an unplanned resource usage, also referred to as an unexpected behavior. For example, in a smart grid, in case one sensor measures abnormally low measurements, such as zero consumption, and therefore is not in accordance with the expected data, this may indicate an error in the sensor, such as the sensor malfunctioning, the sensor's battery being depleted, the sensor being disconnected from a functioning power supply (or a non-typical behavior of the consumer associated with the sensor). As another example, in case many sensors of the same cluster measure abnormally high measurements this may indicate of an unexpected behavior, such as a cold weather in a specific region that causes consumers to increase usage of heating apparatuses, a hot weather causing consumers to use air-conditioning, a sabbatical day where people stay home and therefore use electricity in a non-typical manner, electricity disruption in a region, such as a neighborhood, depleting power supply to the sensors and the like. The user, such as 101 of FIG. 1, may prepare and respond to the unexpected behavior, such as by increasing electricity production, such as by initiating backup generators and the like.

In some exemplary embodiments, the fault detection module 270 may indicate that a consumer has changed consumption profile. For example, a residential consumer may be replaced by a commercial or industrial consumer. As the data associated with the consumer no longer correlates to the expected consumption of a residential cluster, and it does correlate to a consumption profile of a commercial or industrial cluster, the node 200 may identify the transition. In some exemplary embodiments, an indication may be outputted to a designated person or system which is in charge of sales, customer relations or the like. Based upon the indication, a different contract may be offered to the user that would suit his new consumption profile.

In some exemplary embodiments, any indication determined by the fault detection module 270 may transmitted by the transmitter 240 or by another output unit (not shown)

towards the operator node 110, another administrative authority or the like. The transmission may be propagated through the hierarchical structure of the system 100 or using another infrastructure for such purpose.

In some exemplary embodiments, the node 200 may utilize the clustering module 220 once every several time units to determine new clustering. The node 200 may determine new clusters based on rapid migration of child nodes from previously determined clusters and their expected future values. In some exemplary embodiments, in case a "good" clustering schema is determined, most consumers may be consistently associated with the same cluster over time, where the cluster may move spatially over time.

Figure 3:
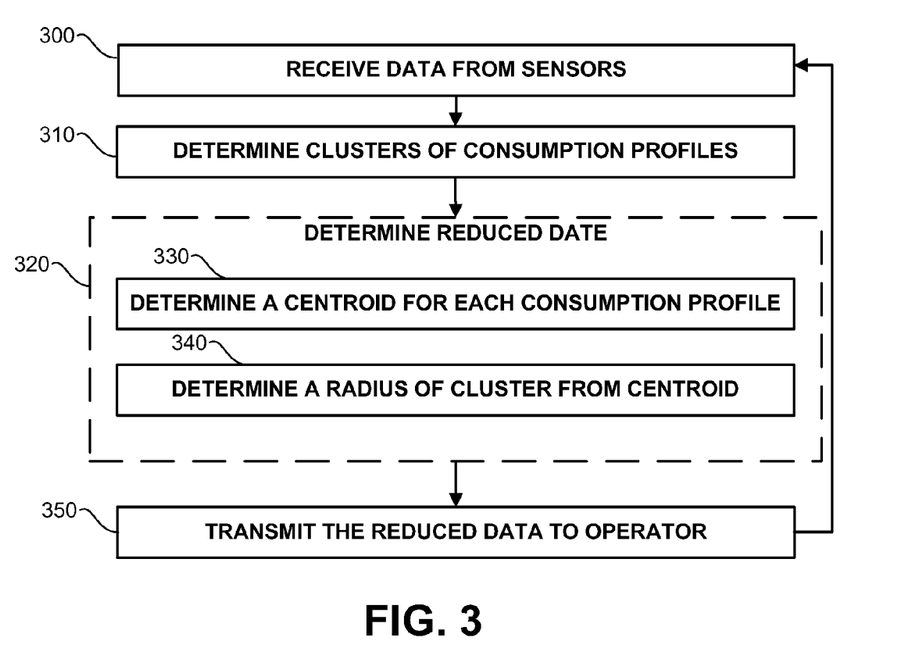
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, data may be received by a node, such as 200 of FIG. 2. The data may be received using a receiver, such as 210 of FIG. 2. The data may be received from a child node of the node, such as a sensor or an intermediate node.

In step 310, clusters may be determined in respect to the data received in step 300. Each cluster may be deemed as associated with a consumption profile, having common characteristics. The clustering may be determined by a clustering module, such as 220 of FIG. 2.

In step 320, reduced data may be determined for a cluster. The reduced data may be determined by a data reduction module, such as 230 of FIG. 2.

Step 320 may comprise step 330. In step 330, a centroid may be determined as a representative of the consumption profile of a cluster.

Step 320 may comprise step 340. In step 340, a radius from the centroid of all the data of the child nodes that are comprised by the cluster may be determined.

In step 350, the reduced data of step 320 may be transmitted towards the operator node 110. The data may be transmitted using a transmitter, such as 240 of FIG. 2.

In some exemplary embodiments, steps 300-350 may be performed iteratively. In some exemplary embodiments, each iteration is associated with a different timeframe. In some exemplary embodiments, an iteration may be associated with 24 hours. After one hour, an additional iteration may be performed, also associated with 24 hours. The second iteration is associated with the 23 last hours of the iteration and with another hour.

Figure 4:
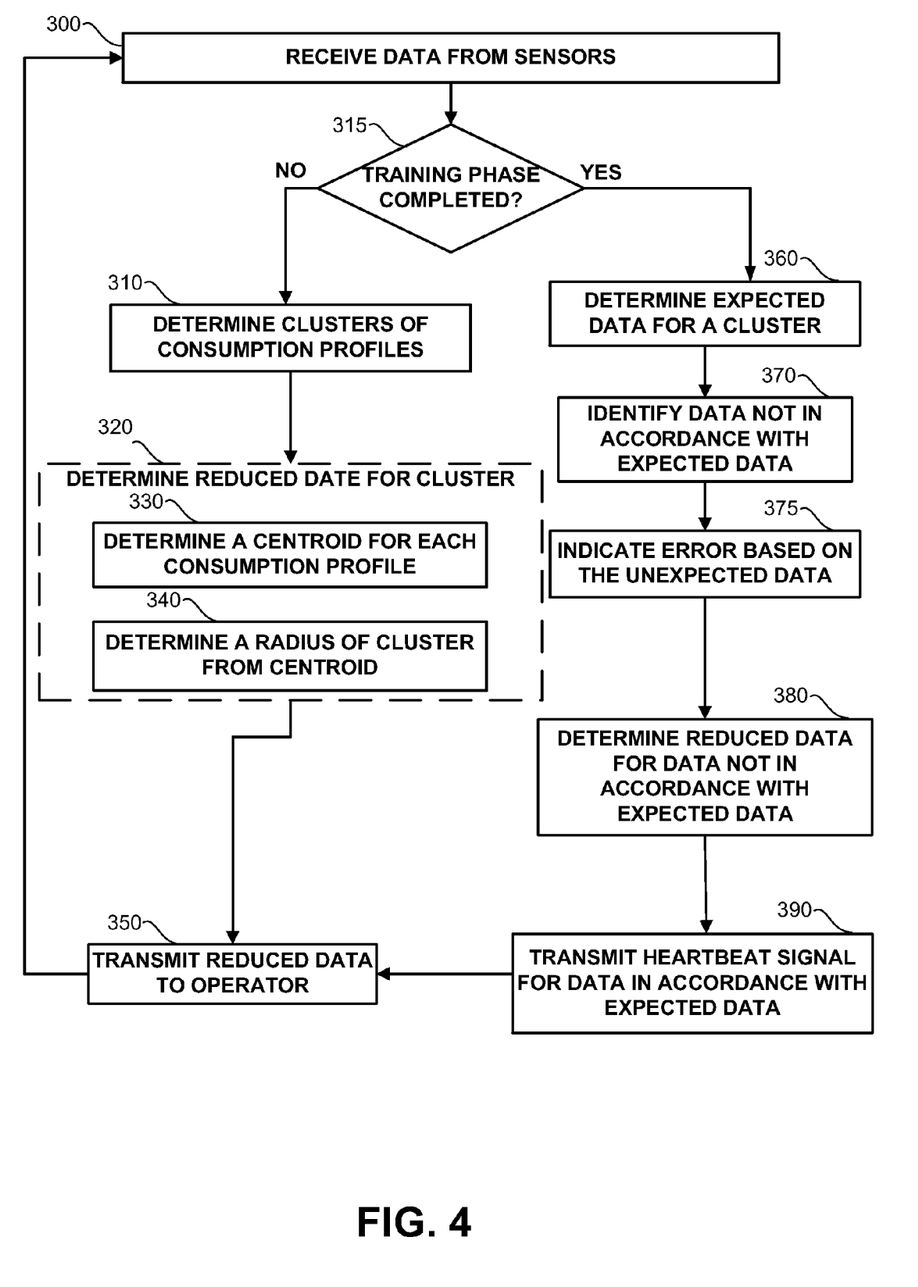
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In step 300, data may be received from nodes.

In step 315, a determination whether a training phase was completed is determined. In case a training phase is not completed, steps 310 and 320 may be performed as part of the training phase. In case the training phase is completed, steps 360-390 may be performed. During the training phase clusters may be determined based on the data. According to correspondence between clusters of child nodes over time, a determination of how a cluster is modified over time may be determined. The training phase may be completed when enough past data is obtained to enable forecasting. The training phase may be of a predetermined number of iterations, a number of iterations associated with a number of dimensions in a point (e.g., in case of a 96-dimension array, the number of iterations may be 3*96=288), based on a stability of the clusters over time, based on user's input, or the like. In some exemplary embodiments, multiple training phases may be performed, each in respect to timeframes of different types. For example, there may be a training phase of a working day and a training phase of a day in the weekend. In some exemplary embodiments, the training phase may consist a small number of the timeframes of the pertinent type, such as for example 3-4 days.

In step 360, expected data for a cluster may be determined The expected data may be determined by a forecasting module, such as 250 of FIG. 2.

In step 370, child nodes that sent data that is not in accordance with the expected data are identified. Data may be compared to expected data using a comparison module, such as 260 of FIG. 2. Any child node associated with data that is not in accordance with the expected data is considered as migrating out of the cluster.

In step 375, errors may be detected based on unexpected data. Errors may be detected by a fault detection module, such as 270 of FIG. 2. Errors may be sent to an administrator, user or the like. Errors may include error in a sensor, error in an intermediate node, power supply shortage in a node (e.g., electricity interruption), unexpected behavior of a single consumer, unexpected behavior of a group of consumers and the like. It will be noted that although the term used here is "error" the unexpected data may indicate unexpected behavior of consumers within the system, which is not necessarily associated with a malfunction of the system 100.

In step 380, a reduced data for unexpected data may be determined. In some cases, child nodes may migrate into existing clusters and be in accordance with expected data of the existing clusters. In some cases, a clustering may be performed in respect to data that is with accordance any expected data. The reduced data may be determined based on the new clusters. In some exemplary embodiments, the reduced data for child nodes that are in accordance with their clusters may be omitted, and thus additional bandwidth and reduction in power consumption may be achieved. For example, in case child nodes of a cluster provide data in accordance with the expected data, no data is sent regarding the child nodes (or the cluster).

In step 390, a heartbeat signal may be sent to indicate that the node performing the method of FIG. 4 is active and not malfunctioning. For example, consider a situation in which all data is as expected, the reduced data may be omitted all together. However, the higher-level node may require a heartbeat signal to indicate that the node is functioning and intentionally avoided sending the information.

In some exemplary embodiments, information may be omitted regarding data that is as expected, based on a presumption that the higher level node is aware of the expected data. This may be achieved in several manner such as for example by previously sending to the parent node a forecasting function indicating expected data based on past data (for example, once the function is determined by the node, sending it to the parent node); by the parent node utilizing a forecasting module to independently determine the expected vale or the like.

In some exemplary embodiments, sensors may comprise a forecasting module so at to avoid sending data that is as expected. The node may update the sensors with a forecasting function, and the sensors may transmit a heartbeat signal in case the monitored data is as expected.

In step 350, the reduced data, either determined in step 320 or in step 380, may be transmitted.

In some exemplary embodiments, steps 300-390 may be performed iteratively. In each iteration, steps 300-390 (or a portion thereof) may be performed. Each iteration may be associated with a different timeframe. A timeframe may or may not overlap with timeframes of other iterations.

Figure 5:
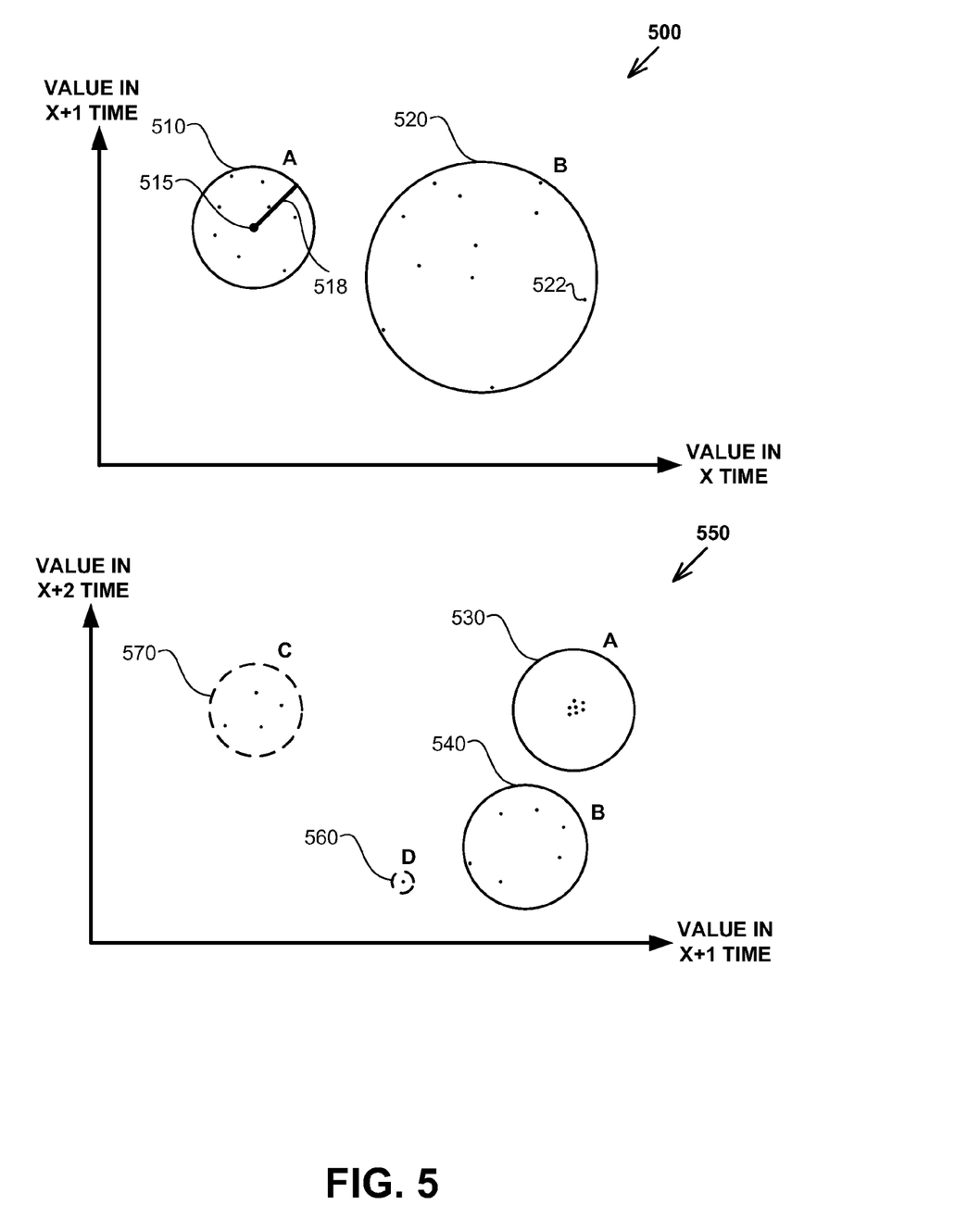
FIG. 5 shows an illustration of clusters and expected data, in accordance with some exemplary embodiments of the disclosed subject matter.

Referring now to FIG. 5 showing an illustration of clusters and expected data, in accordance with some exemplary embodiments of the disclosed subject matter. FIG. 5 exemplifies the disclosed subject matter by using a 2-dimensional array to represent data. The disclosed subject matter is not restricted to such a 2-dimensional view.

Chart 500 shows points, such as point 522 in a 2-dimensional space. A point is associated with data received from a child node that is associated with a first timeframe—between X time and X+1 time. For example, in case each measurement represents a measurement of an hour-2 hours, between, for example, 14:00 and 16:00. The point is located in the 2-dimensional space based on a value in X time (X-axis) and value in X+1 time (Y-axis).

Clustering of the points may be performed, and two clusters may be determined: cluster A 510 and cluster B 520. Each point is comprised by a cluster. The clusters are represented by a circle. Other spatial shapes in the 2-dimension space may be used instead of circles. The reduced data may be sent by a node instead of propagating the data associated with the points. In such a manner reduction in transmitted data is achieved—instead of sending data associated with 18 points, data associated with two clusters is sent. The reduced data may include a centroid of a cluster, such as centroid 515, a radius of a cluster, such as radius 518, a number of child nodes associated with the cluster, identifiers of child nodes associated with the cluster and the like.

Chart 550 is similar to chart 500 but is representative of another timeframe—between X+1 time and X+2 time—which is a successive timeframe after the first timeframe (between X time and X+1 time). Based on a forecasting module, cluster A 510 may be expected to move to cluster A 530. In a similar manner, cluster B 520 may be expected to move to cluster B 540. Some points may migrate out of their respective clusters. For example, one point migrated to an area D 560 and 4 points migrated to area C 570. In some exemplary embodiments, the point of area D 560 may indicate an error in the sensor, a consumer acting in a non-typical behavior or the like. In some exemplary embodiments, the points of area C 570 may indicate a non-typical behavior of a group of consumers, such as for example within a neighborhood. Clustering may be performed to determine clusters C and D. Reduced data associated with the clusters C and D may be sent. In some exemplary embodiments, the receiving party (higher level node or operator node) may determine independently, based on receiving data about clusters C and D that all points of child nodes within cluster A 530 and B 540 acted in accordance with the expected data.

In some exemplary embodiments, a point may migrate from a cluster to another cluster. Such migration may occur immediately (e.g., from cluster A 510 to cluster B 540) or through at least one intermediate phase (e.g, from cluster A 510 to cluster C 570 and in the future to cluster B).

It will be noted that in some exemplary embodiments, a radius of a cluster may be modified over time (e.g., expected data of a cluster includes an increase, decrease or other modification of the radius, such as between cluster B 520 and cluster B 540)

In some exemplary embodiments, newly created clusters do not have an expected data in the next iteration of a method, such as the method of FIG. 4. Training phase may begin for such clusters while still using the expected data associated with other clusters (e.g., clusters A and B).

Forecasting

As another example, denote data from a node i in timeframe j is denoted with $m^{\{i\}}\_j$. The cluster to which the node is associated in timeframe j is denoted by $C^{\{i\}}\_j$. Expected bounds of a cluster is denoted by E(C), where C is the cluster. A parent node may therefore receive $m^{\{i\}}\_j$ and compare it with $E(C^{\{i\}}\_(j-1))$. In case the data is within the bounds of the expected cluster that was associated with node i, transmission of data associated with node i for timeframe j may be omitted. In case the data is not within the bounds of the expected cluster, but within the expected bounds of another cluster, data specifying the new cluster $C^{\{i\}}\_j$ (which is different than $C^{\{i\}}\_(j-1)$) may be transmitted. In case the data is not within any bounds of any expected cluster, new clustering may be determined and computed. Note that in a steady-state of the system 100, it is believed that most nodes would behave in accordance with the expected values.

In some exemplary embodiments, in case the number of clusters increases above a predetermined threshold, such as ten clusters, the clusters may be recomputed for all child nodes.

Fault Detection

In some exemplary embodiments, irregular events may be identified by a fault detection module, such as 270 of FIG. 2. Irregular events may be identified by comparing a measurement $m^{\{i\}}$ with the expected cluster $E(C^{\{i\}}\_(j-1))$. In case a measurement derives significantly from the expected cluster, an irregular event may be identified and indicated. In case a significant fraction of child nodes migrate out of a cluster, an irregular event may be identified and indicated. The identification may be based on predetermined rules, parameters and thresholds, such as for example a significant fraction may be predetermined such as 20% or more or the like, a distance between a measurement and a centroid of the expected cluster may be utilized to determine that the measurement derives significantly from the cluster, such as above a predetermined distance, such as the radius, or the like.

In some exemplary embodiments, in case an irregular event is identified, measurement associated with irregular event may be sent in a non-reduced manner. Providing non-reduced data may be useful to the user of the operator node to understand the meaning of the irregular event. In some exemplary embodiments, a set of measurements that is associated with the irregular event may be aggregated together to a reduced data to provide the user of the operator node a summarized view of the full data.

In some exemplary embodiments, a resolution module (not shown) may be comprised by the node 200 to determine a resolution of data associated with the irregular event. The resolution may determine whether or not to reduce the measurements, how many measurements to aggregate together and the like. In some exemplary embodiments, the resolution may be determined based on a measurement of similarity between the measurements and the expected measurements. The measurement of similarity may be defined by a distance between the actual cluster and the expected cluster. For example, referring to FIG. 5, assuming clusters C 570 and D 560 comprise measurements that were excepted to be in cluster B 540, the distance between the centroid of cluster B 540 (not shown) and the centroid of cluster D 560 (not shown) is greater than the distance between the centroid of cluster B 540 and the centroid of cluster C 570 (not shown). A different resolution may be determined in respect to clusters C 570 and D 560 based upon the different measurement of similarity.

Multiple Aggregation Levels

In some exemplary embodiments, the system 100 comprises multiple hierarchy levels. An intermediate node may receive data from child nodes. The data received may be a centroid or other reduced data. The intermediate node may perform clustering and reduction of the data to a second reduced data. In some exemplary embodiments, a weight of a centroid, corresponding to a number of a nodes associated with the cluster of the centroid, may be provided to the intermediate node.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

What is claimed is:

1. A computerized system comprising:
   at least one intermediate node; wherein said at least one intermediate node is connected to a plurality of sensors operable to monitor usage of a resource; wherein said at least one intermediate node is connected to an operator node;
   wherein said at least one intermediate node comprises:
      a receiver configured to receive data from the plurality of sensors,
         wherein the data is indicative of usage of the resource during a timeframe,
         wherein the data received from the plurality of sensors comprises a list of a predetermined number of values of monitored resource consumption values,
         wherein the list corresponds to a point in a space having n-dimensions; wherein n is the predetermined number of values; wherein the clustering module is configured to determine a cluster of the set of clusters based on distances between points in a space, and
         wherein the points correspond to the data;
      a clustering module configured to determine a set of clusters based upon the data; wherein each cluster of the set of clusters groups one or more sensors of the plurality of sensors;
      a data reduction module configured to determine a reduced data associated with a cluster of the set of clusters; the reduced data comprises:
         a consumption profile indicative of usage of the resource during the timeframe; and
         identifications of sensors grouped by the cluster; and
      a transmitter configured to send the reduced data.

2. The computerized system of claim 1, wherein the consumption profile is associated with about a centroid of a portion of the space; and wherein the portion of the space comprises points associated with the sensors grouped by the cluster.

3. The computerized system of claim 2, wherein the reduced data further comprises a radius of the portion of the space; wherein the radius is substantially a maximal distance between the centroid and the points associated with the sensors grouped by the cluster.

4. The computerized system of claim 1, wherein said at least one intermediate node further comprises:
   a forecasting module configured to determine an expected data associated with the consumption profile based on a previous data associated with the consumption profile; and
   wherein said transmitter is configured to transmit a portion of the reduced data based on data of sensors that is substantially different than the expected data.

5. The computerized system of claim 4, wherein said at least one intermediate node further comprises a comparison module that is configured to determine whether a data of a sensor is substantially different than the expected data based on a distance between the data and the expected data in respect to a space having n-dimensions; wherein n is the predetermined number of values; and wherein said transmitter is configured to utilize the comparison module.

6. The computerized system of claim 4, wherein said at least one intermediate node further comprises:
a fault detection module configured to provide an indication to the operator node of a non-standard behavior based on a correlation between the expected data and the data.

7. The computerized system of claim 1, wherein the data received from the plurality of sensors comprises a set of lists of monitored resource consumption values; wherein each of the set of lists having a predetermined number of values; and wherein each of the set of lists is associated with a different consumption unit.

8. The computerized system of claim 1, wherein the plurality of sensors are selected from the group consisting of electricity meters, gas meters, heat meters, watering meters and traffic meters.

9. The computerized system of claim 1,
wherein said at least one intermediate node comprises at least two intermediate nodes; wherein said at least two intermediate nodes are arranged in a hierarchy;
wherein an intermediate node of said at least two intermediate nodes is indirectly connected to the plurality of sensors via one or more intermediate nodes of said at least two intermediate nodes;
wherein said one or more intermediate nodes are indirectly connected to the operator via said intermediate node;
wherein said intermediate node is configured to receive a plurality of profile data from the one or more intermediate nodes;
wherein said intermediate node is further configured to determine clustering based on the plurality of profile data; and
wherein said intermediate node is further configured to send the reduced data of the plurality of profile data to the operator.

10. The computerized system of claim 1, wherein the computerized system is configured to operate over a plurality of timeframes; and wherein at least a first timeframe of the plurality of timeframes overlaps a second timeframe of the plurality of timeframes.

11. A computerized method for transmitting data in a metering infrastructure from a plurality of sensors to an operator node through at least one intermediate node, wherein the plurality of sensor are operable to monitor usage of a resource in a plurality of geographical regions; the method comprises at the at least one intermediate node:
receiving data from the plurality of sensors,
wherein the data is indicative of usage of the resource during a timeframe,
wherein the data received from the plurality of sensors comprises a list of predetermined number of values of monitored resource consumption values, and
wherein the list corresponds to a point in a space having n-dimensions; wherein n is the predetermined number of values;
determining a set of clusters based upon the data; wherein each cluster of the set of clusters groups one or more sensors of the plurality of sensors, wherein a cluster of the set of clusters is determined based on distances between points in a space, wherein the points correspond to the data;

determining, by a processor of the at least one intermediate node, a reduced data associated with a cluster of the set of clusters; the reduced data comprises:
a consumption profile indicative of usage of the resource during the timeframe; and
identifications of sensors grouped by the cluster; and
transmitting the reduced data towards the operator node.

12. The method of claim 11, wherein said receiving data, said determining a set of clusters, said determining a reduced data and transmitting the reduced data are performed a plurality of times in respect to a plurality of timeframes.

13. The method of claim 12, wherein at least a portion of the plurality of timeframes overlap each other.

14. The method of claim 11, wherein the consumption profile is a point in a space; wherein the space having a n-dimensions; wherein the point is associated with a centroid associated with a portion of the space comprising the points in the space that correspond to the data received from the sensors grouped by the cluster.

15. The method of claim 14, wherein the reduced data further comprises a radius of the portion of the space; wherein the radius is substantially a maximal distance between the centroid and the points associated with the sensors grouped by the cluster.

16. The method of claim 11, wherein the at least one intermediate node comprises at least two intermediate nodes arranged in a hierarchy; the method further comprises:
a first set of intermediate nodes of a first hierarchy transmitting the reduced data to a second intermediate node of a second hierarchy;
the second intermediate node receiving the reduced data;
the second intermediate node determining clusters of consumption profiles;
the second intermediate node determining a second reduced data; and
the second intermediate node transmitting the second reduced data towards the operator node.

17. The method of claim 11 further comprises:
the at least one intermediate node determining an expected data based on a previous data associated with the consumption profile;
the at least one intermediate node determining whether the data is substantially different than the expected data; and
wherein said determining the reduced data comprises determination of the reduced data in respect to the data that is substantially different than the expected data.

18. The method of claim 17 further comprises: providing an indication to the operator node of a non-standard behavior based on a correlation between the expected data and the data.

19. A computer program product for an intermediate node transmitting data received from a plurality of sensors towards an operator node, the computer program product comprising:
a non-transitory computer readable medium comprising computer instructions stored therein for causing a computer processor to perform steps of:
receiving data from the plurality of sensors,
wherein the data is indicative of usage of a resource during a timeframe;
wherein the data received from the plurality of sensors comprises a list of a predetermined number of values of monitored resource consumption values and,
wherein the list corresponds to a point in a space having n-dimensions; wherein n is the predetermined number of values;
determining a set of clusters based upon the data; wherein each cluster of the set of clusters groups one or more sensors of the plurality of sensors, wherein a cluster of the set of clusters is determined based on distance between points in a space, wherein the points correspond to the data;

determining a reduced data associated with a cluster of the set of clusters; the reduced data comprises:
   a consumption profile indicative of usage of the resource during the timeframe; and
   identifications of sensors grouped by the cluster; and transmitting the reduced data towards the operator node.

* * * * *